United States Patent [19]

Castro

[11] 4,043,461
[45] Aug. 23, 1977

[54] STACK LOADER FOR BALES

[76] Inventor: Manuel A. Castro, P. O. Box 193, Banta, Calif. 95304

[21] Appl. No.: 598,701

[22] Filed: July 24, 1975

Related U.S. Application Data

[63] Continuation of Ser. No. 429,363, Dec. 28, 1973, abandoned.

[51] Int. Cl.² .............................................. B65G 57/32
[52] U.S. Cl. .................................. 214/6 B; 214/83.3; 214/519
[58] Field of Search ................ 214/6 B, 518, 519, 520, 214/521, 522, 83.3; 198/7 BL, 221, 222, 223, 224, 225

[56] References Cited

U.S. PATENT DOCUMENTS

| | | | |
|---|---|---|---|
| 3,289,859 | 12/1966 | Tarbox | 214/6 B |
| 3,521,762 | 7/1970 | Walters | 214/6 B |
| 3,596,777 | 8/1971 | Neely, Jr. | 214/6 B |
| 3,664,519 | 5/1972 | Grey | 214/6 B |
| 3,687,302 | 8/1972 | Castro | 214/6 B |

Primary Examiner—Robert J. Spar
Assistant Examiner—Ross Weaver
Attorney, Agent, or Firm—Julian Caplan

[57] ABSTRACT

To enable the operator to form stacks having improved characteristics, a commercially available stack loading machine is modified. Firstly, to enable the stack to be deposited on the ground with all bales flat (i.e. with their 24 × 48 inch sides horizontal), the bales are deposited by the baler flat instead of on edge (i.e. on their 18 × 48 inch sides). The loader is widened to accept the bales and deposits the bales on the first (forward) table on edge and extending transverse. Transfer from the first to the second table tilts the bales flat and the second table tilts the bales on edge after transfer to the load rack. Thus, the bales are deposited on the ground flat. Rearward movement of the bales on the second table may be performed by a transversely extending, longitudinally reciprocating ram-actuated bar which slides on the second table and has rake-like teeth to pull the bales rearward. This feature permits movement of the first four bales of an eight-bale tie tier to the rear of the second table to provide room at the front of the second table for the proper assembly of the last four bales of a tie tier. Alternatively, belts or chains may be mounted on the second table to move the first four bales rearward. As a further modification, an intermediate tilting table is located between the first and second tables and the loader is mounted on the machine to move between two positions so that it may deposit bales on edge on either the first or intermediate table at the option of the operator and thereby deposit the bales on the second table on edge or flat, respectively, and ultimately deposit the bales in the stack either flat or on edge, respectively.

2 Claims, 7 Drawing Figures

STACK LOADER FOR BALES

This is a continuation of application Ser. No. 429,363 filed Dec. 28, 1973, now abandoned.

This invention relates to a new and improved stack loader for bales. Reference is made to U.S. Pat. No. 3,687,302 which illustrates and describes a form of machine of which the present application is an improvement and which is itself an improvement upon the New Holland automatic bale wagon therein described.

The type of baler commonly used in western United States produces bales having a length of approximately 48 inches, width of 24 inches and height of 18 inches. At present, said bales are deposited by the baling machine on the ground resting on one of their 18 × 48 inch faces. A feature of the present invention is the fact that the baling machines are adjusted to deposit the bales on the ground on their 24 × 48 inch faces, and in this condition the bales are more stable. If a bale tilts in the field either prior to or while being loaded into the stacker machine, the operator must dismount during the proper loading of the bale. This inconvenience is avoided by the present invention.

Another feature of the invention is the fact that the bales are deposited on the second table of the stacker flat, a term which is used in this specification to mean lying on the 24 × 48 inch side. After the tier of bales is transferred from the second table to the load rack and subsequently deposited on the ground, the bales rest on their edges, a term used in this specification to means on their 48 × 18 inch sides. When the bales are resting on the ground on their edges, the baling wires are not in contact with the ground and hence corrosiion of the wires is reduced even after prolonged storage.

Further, a feature of the invention is the fact that the mechanism hereinafter described in detail to accomplish the foregoing objects may be either installed as original equipment on the stacker machine or may be supplied as a kit to be installed on an existing stacker. When installed as a kit, the amount of labor required to convert the existing stacker is minimal and requires no special equipment other than welding and cutting equipment, all of which are generally available in agricultural machinery repair shops.

Another feature of the invention is the provision of means for depositing the bales on the second table either on their flat sides or edges at the discretion of the operator. Alternatively, if the bales have been deposited in the field on their edges rather than flat, the equipment will form the stack with either the edges or the flat sides resting on the ground, again at the option of the operator.

In connection with the foregoing described object of the invention, an intermediate table is installed between the first table and second table. The loader (chute) which lifts the bales from the ground to the level of the first or intermediate table is mounted on a horizontal-longitudinal slide so that the loader may be positioned to deposit the bales either on the first table or the intermediate table. If deposited on the first table, the bale is turned twice through 90° of rotation before reaching the second table. If deposited on the intermediate table, the bale is rotated only once before being deposited on the second table.

Still another feature of the invention is the provision on the second table of conveyor apparatus which moves bales deposited on the forward end of the second table to the rear. This feature makes its possible to form a pattern of four bales into a "tie" arrangement, then moves the bales rearward out of the way and permits the next four bales of the layer to be deposited and properly oriented. The provision of tie tiers in a stacker is very desirable in that the formation of such tiers inhibits tendency of the stack to tip and highway regulations for the transportation of hay generally requires that tie tiers of bales be formed in a stack to reduce danger.

In the following portion of the specification, alternate means for moving one-half of the tie tier rearward on the second table are illustrated and described. One means comprises a transverse bar which reciprocates longitudinally of the top of the second table and has a plurality of tines similar to rake tines which engage the bales and move them to the rear as a ram reciprocates the transverse bar. Alternate means comprise pluralities of endless belts mounted on the table top. Conveyor chains may be used to replace the belt.

Other objects of the present invention will become apparent upon reading the following specification and referring to the accompanying drawings in which similar characters of reference represent corresponding parts in each of the several views.

Figure 1:
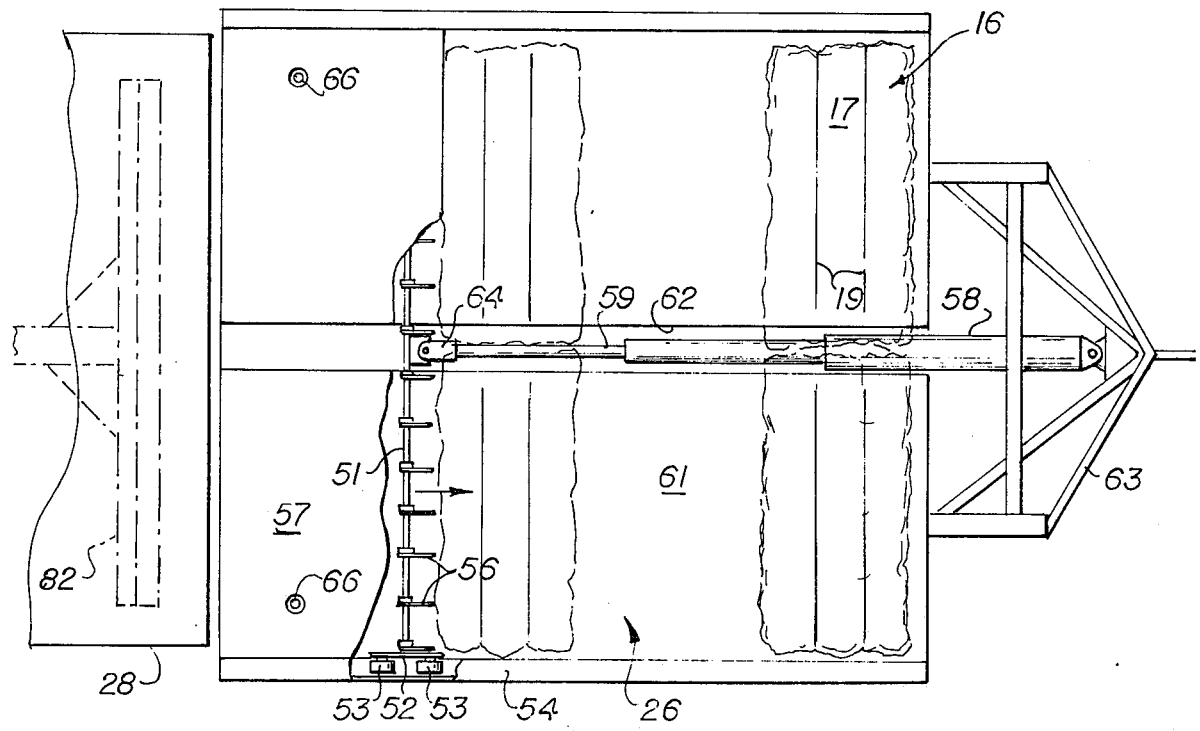
FIG. 1 is a fragmentary top plan view of a portion of a stack loader illustrating one form of the present invention.

As has been stated, the bales 16 of the present invention are preferably 48 inches in length and have a flat side 17 dimensioned 48 × 24 inches and an edge 18 × 48 inches. A plurality of wires 19 extends longitudinally of the flat sides (as well as the ends) of the bale 16. Baling machines may be adjusted to deposit the bales on the ground either on the edge 18 or the flat side 17. Because of the structure of common stackers commercially available, the bales are presently deposited on their edges 18, a position which is inherently unstable as compared with the flat side deposit. One of the features of the present invention is the fact that the bales may be deposited on the ground on the flat side and handled in accordance with the present invention for the formation of a stack. Additionally, the stack may be formed so that the bales rest on the ground after the stack has been formed either on edge or on the flat side. Edge stacking is preferable because the wires 19 are not resting on the ground and hence are not as likely to corrode as when the bales are stacked flat. It will further be understood that it is sometimes desirable to form a stack with the bottom layer on edge and the other layers flat. The present invention facilitates the handling of bales deposited in the field flat and also provides means for forming a stack with either all or the bottom-most layer of bales flat.

The machine herein illustrated in a modification of a commercially available machine produced by New Holland known as the "Super 1048" stack cruiser. An early version of such machine is shown in Grey U.S. Pat. No. 2,848,172.

The machine comprises an elongated frame 21 supported by ground engaging wheels (not shown) having at its front on one side a cab 22 for the operator and controls. Extending from the side opposite the cab at the front of the machine is a loader 23 which engages the bales in the field and lifts them above the frame 21. Immediately behind cab 22 extending horizontally transversely of the machine is the first table 24 which normally receives the bales from the loader 23. Rearward of the first table 24 is second table 26 which is mounted about pivots at its rear to transmit a tier of bales on to a load rack (not shown) immediately behind the second table. From the load rack the bales are deposited on the ground or on to a truck by means forming no part of the present invention.

In accordance with one form of the present invention shown in FIG. 3 and intermediate table 27 is positioned between the first table 24 and second table 26, all as hereinafter explained.

Figure 2:
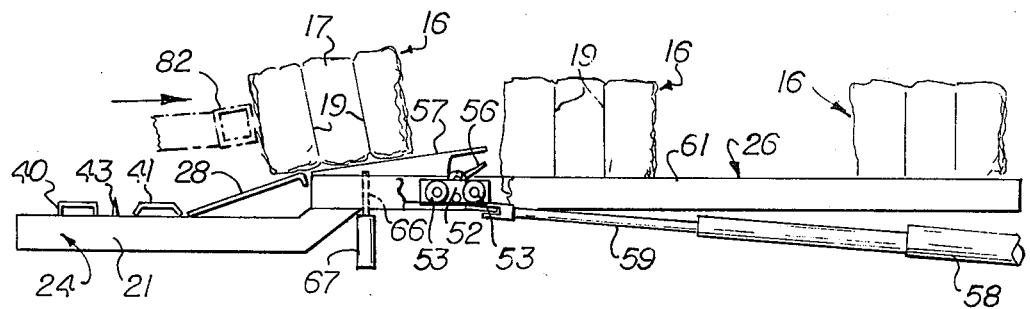
FIG. 2 is a side elevational view of a portion of the structure of FIG. 1.
Figure 3:
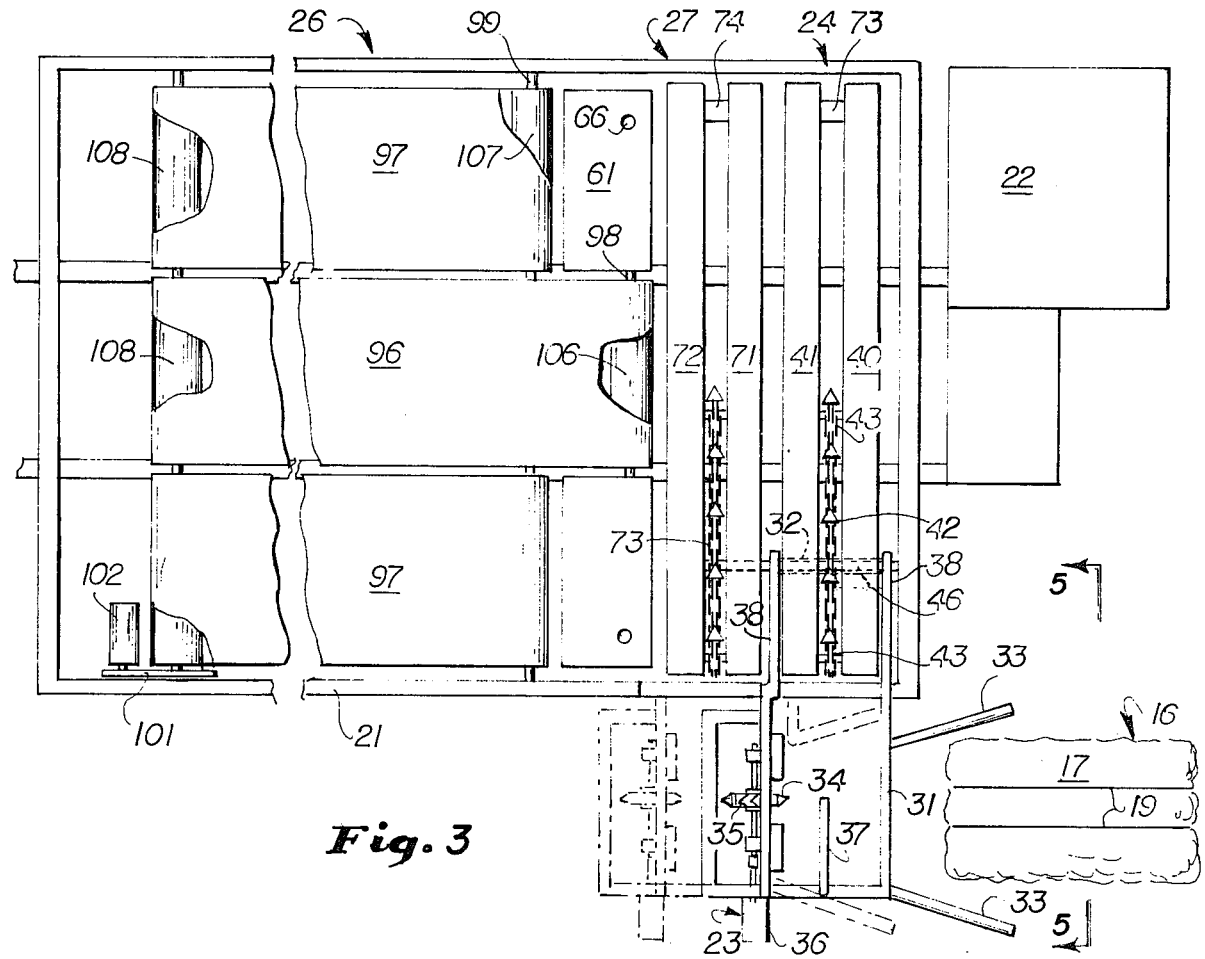
FIG. 3 is a top plan view of a modified construction.
Figure 4:
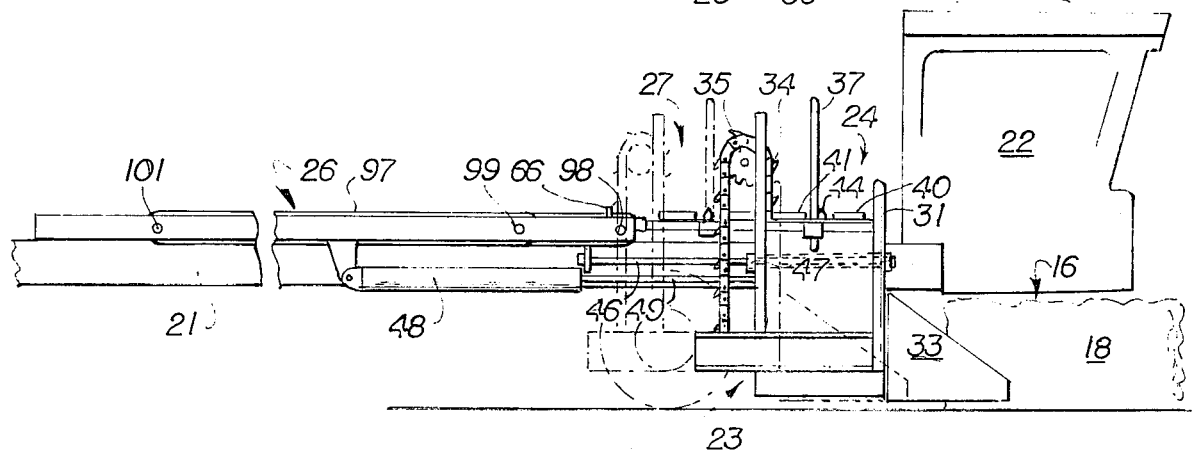
FIG. 4 is a side elevational view of the structure of FIG. 3.
Figure 6:
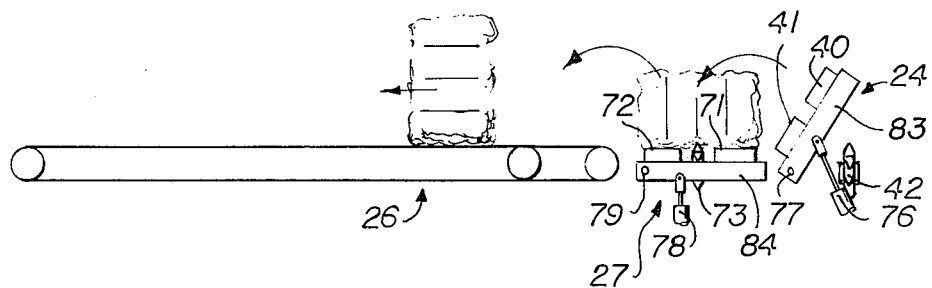
FIG. 6 is a fragmentary schematic view of a portion of the structure of FIG. 3 showing transfer of a bale from the first to the intermediate table.
Figure 7:
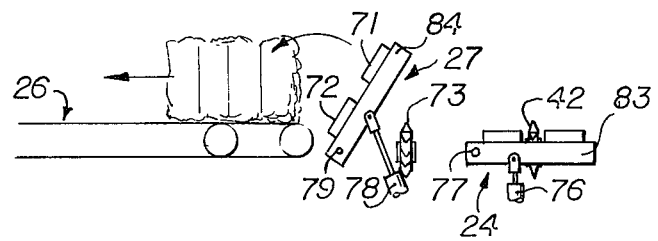
FIG. 7 is a view similar to FIG. 6 showing transfer of a bale from the intermediate to second table.
Figure 5:
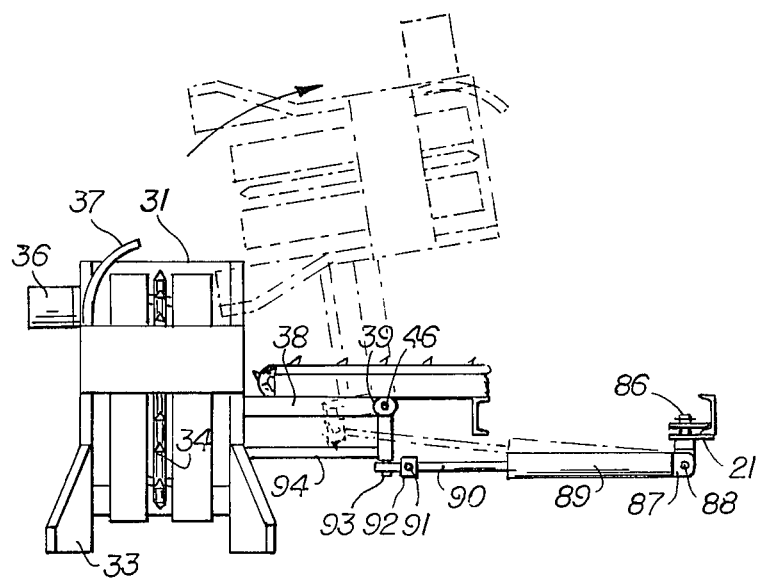
FIG. 5 is an enlarged front elevational view of a portion of the structure of FIG. 3 as viewed along the line 5—5 of FIG. 4.

Directing attention to FIGS. 3–5, a loader 23 is illustrated, it being understood that a somewhat similar loader is used with the modification of FIGS. 1–2 but not illustrated therein. Loader 23 comprises a loader frame 31 which is mounted by longitudinal-horizontal pivots 32 to frame 21. At the front of frame 21 are forwardly-outwardly diverging pick-up guides 33 which are spaced apart wide enough so that as the machine is steered by the operator along the field the bales 16 are guided into the frame 21. In a preferred form of the invention, the space between the guides 33 is sufficient to accept a bale with the flat side 17 downmost as contrasted with conventional machines which are constructed so as to accept only a bale on edge 16. Extending vertically near the rear of frame 21 is a conveyor chain 34 suitably mounted on sprockets 35 at top and bottom and driven by hydraulic motor 36. The chain 34 lifts the rearward end of bale 16 upward until the bale is in vertical position. Extending inward from the outside of frame 21 is a turn guide 37 which tilts the bale inwardly of the machine so that it rests on the first table 24 (in a preferred form of the invention shown in FIGS. 1-2) on edge 18 extending horizontally transversely of the machine.

First table 24 comprises forward and rear horizontal transverse slides 40, 41 which are separated by a gap through which protrudes conveyor chain 42 mounted on sprockets 43 and having lugs 44 which extend above the top surfaces of slides 40, 41. When a bale 16y is deposited resting on slides 40, 41 and the motor (not shown) which drives chain 42 is actuated, the bale is moved transversely of the table 24. Various controls (not shown) may be employed to automatically de-energize the motor driving the chain 42. It will be noted that the inmost sprocket 43 is located about midway of the width of table 24. The first bale 16 deposited on table 24 may be moved by chain 42 partially across the table 24 and the second bale moved by chain 42 pushes the first bale to the completion of its movement. In some instances, however, a bale is moved only half of the distance across the table to form a tie tier as hereinafter explained.

As has heretofore been explained, a loader 23 is employed in the form of the invention shown in FIGS. 1-2 but is not therein illustrated, the illustration of the loader of FIGS. 3-5 being thought to be sufficient. Directing attention now to the form of the invention shown in FIGS. 1-2, a ramp 28 slants upwardly-rearwardly from first table 24 to the level of second table 26. One means for moving the bale from the table 24 to the table 26 is that as shown in U.S. Pat. No. 3,687,302 being the pusher bar 49 which is denominated in the accompanying drawings by reference numeral 82 and which may be mounted and actuated by the means shown in said patent or by other means. It will be understood that other and different mechanism for transferring the bales from the first table rearwardly to the second table may be employed.

As has been mentioned, one of the objectives of the present invention is to assist in forming a tie tier on the second table. Two bales are transferred from the first table to a position extending transversely of the second table. Thereupon, spikes 66 are projected upwardly by means of ram 67 to impale the outer ends of said bales. The next bale received from loader 23 on first table 24 is moved by chains 42 only to the middle of the table and is then transmitted by pusher 82 or other means on to the second table 26, and as it is pushed rearwardly, it pivots the first two bales of the pattern which are impaled by the spikes 66 toward a longitudinal position. The fourth bale is then transferred from the middle of the first table to the second table behind the third bale and pushes the third bale rearward completing the pivotal movement of the first two bales. At this point, the first two bales are located longitudinally and the third and fourth bales are transversely disposed between the first two bales. It is desirable that the four bales which make up one half of the tier be removed from the front of the second table to permit formation of the pattern of the next four bales. One preferred means for accomplishing this objective is the location of a transverse horizontal rod 51 above the top surface 61 of second table 26. On the outer ends of rod 51 are brackets 52 which carry rollers 53 on either side of the machine which roll within inward facing channels 54. Channels 54 guide movement of rod 51 for horizontal reciprocation parallel to the top surface 61. A plurality of flexible wire tines 56 are secured to rod 51 shaped similar to rotary rake wheel tines. A ramp continuation 57 which is an extension of ramp 28 overhangs rod 51 in its forwardmost position and enables the bales 16 to move rearward to the position of the right-hand bale 16 of FIG. 3. The top surface 61 is formed with a longitudinally extending opening 62 at its center and below opening 62 is a ram 58 having a rod 59 extending forwardly. The rearwardly end of ram 58 is pivotally secured to a sub-frame 63 extending rearward of table 26 and the forward end of rod 59 is attached to a fitting 64 which is in turn connected to rod 51. When a pattern of four bales has been formed, partially on ramp continuation 57 and partially on surface 61, spikes 66 are retracted by ram 67 and pusher bar 82 or other means push the bales on ramp continuation 57 rearwardly and onto surface 61. By actuating ram 58, the rod 51 may be pulled rearward, forcing the pattern of bales to the rear of table 26 and enabling the second half or last four bales of the pattern to be assembled on table 26 in the same manner as the first four bales. Upon completion of the assembly of both halves of the tier, the table 26 is tilted to vertical position and the bales thereon are transferred to the load rack (not shown) which is immediately to the rear of second table 26.

Directing attention now to the form of the invention shown in FIGS. 3–7, intermediate table 27 is installed between first table 24 and second table 26. Intermediate table 27 comprises forward and rear transverse horizontal slides 71, 72 which resemble slides 40, 41 and intermediate these slides is a chain 73 similar to chain 42 and similarly mounted and actuated. Slides 40, 41 are mounted on frame members 83 which are pivoted at their rear end on horizontal transverse pivot 77 attached to frame 21. First table 24 tilt rams 76 causes table 24 to pivot from horizontal position to the tilted position shown in FIG. 6 which results in a bale held thereon being transverse to intermediate table 27 and being tilted 90° about a horizontal transverse axis.

Intermediate table 27 has frame members 84 supporting slides 71 and 72 and pivoted by means of pivot 79 in a manner similar to pivot 71. Bales deposited on table 27 are transferred to table 26 by actuation of ram 78 similar to ram 76 which tilts the intermediate table to the position shown in FIG. 7 and causes the bale previously located on intermediate table 27 to be transferred to second table 26 and also rotated 90° about a horizontal transverse axis.

One of the important features of the invention shown in FIGS. 3–7 is the mounting of loader 23 so that it may be moved from the solid line position of FIG. 3 wherein it discharges bales on to first table 24 to the dot-and-dash position whereupon it deposits bales on to the intermediate table 27. Various means may be employed to mount the loader 23. Pivot rod 46 is horizontally-longitudinally mounted on the edge of frame 21, sleeve 32 slides on rod 46 and is connected to frame 31. A longitudinal ram 48 is pivotally mounted to frame 21 and extending forwardly thereof is a rod 49 which is attached to sleeve 31. Brackets 38 fixed to frame 31 have bushings 39 sliding on pivot rod 46 to either end of sleeve 32. By actuation of ram 48, the loader 23 may be caused to move longitudinal to the two positions heretofore described.

It is desirable that frame 31 be pivoted from the solid line position of FIG. 5 to the dot-and-dash position so that it does not extend laterally beyond the width limits of highway regulations. For such purpose, a ram 89 having a rod 90 is employed. In order to enable the ram 89 to tilt the frame 31 in either of the two longitudinal positions, it is desirable that it be so mounted that it may both swivel and pivot. As is best shown in FIG. 5, vertical swivel 86 is supported by a suitable portion of frame 31 and has at its lower end a fitting 87 carrying a pivot 88 which supports the inward end of ram 89. The outer end of rod 90 is attached by pivot 91 to a fitting 92 which is connected by a swivel 93 to arm 94 extending from frame 31. When the rod 90 is extended, the arm 94 is pivoted around pivot rod 46 to move from solid line to dot-and-dash line position.

An alternate means of moving the pattern of bales rearwardly is shown in FIGS. 3 and 4. The table 61 is cutaway to provide for three belts. The center belt 96 extends from the forward end of second table 26 to adjacent the rearward end thereof, and on either side thereof are side belts 97 which have their forward ends spaced considerably rearwardly of the position where the spikes 66 project up through table 61. The forward end of belt 96 is supported by a pulley 106 on forward pulley shaft 98 which extends horizontally transversely of the machine and the forward ends of side belts 97 are supported by pulleys 107 on shaft 99, the shafts 98 and 99 being journalled in the sides of frame 21. There are also rear pulleys 108 at the rear of the belts 96, 97 which are mounted on a common transverse horizontal shaft 101 driven by motor 102.

The pattern of four bales making up one half of the tie tier of bales may be moved rearwardly by energizing motor 102 to move the top stretches of belts 96, 97 rearward to accomplish the same purpose as the movement of rod 51 of the modification of FIGS. 1–2. Although not illustrated herein, it will be understood that instead of belts 96, 97 conveyor chains may be substituted as will be readily understood by one skilled in the art to which this invention pertains.

What is claimed is:

1. A bale stacking machine comprising a ground-support frame, a first table extending transversely of said frame, a loader on a first side of said frame having first means for lifting bales from the ground and depositing said bales one at a time on said machine extending transversely of said frame, a second table on said frame rearward of said first table, second means for moving bales longitudinally rearward from said first table onto the forward end of said second table, said second means being operable to move said bales so that the same surfaces of said bales that rest on said first table rest on said second table, restraining means adjacent each forward corner of said second table selectively operable to hold the forward outer corners of a pair of first bales on said second table, as a subsequent second bale deposited on the middle of the forward edge of said second table turns said pair of first bales from a transverse direction toward a longitudinal direction, and longitudinal conveying means on said second table to move a pattern of four bales longitudinally rearwardly on said second table from said forward end to the rearward end of said second table, said second means depositing said bales on said second table rearward of the foremost position of said longitudinal conveying means, said longitudinal conveying means comprising a rod extending transversely of said second table having upstanding bale-engaging tines to push bales on said second table rearwardly, guide means guiding said rod for reciprocation on said second table, actuating means for actuating movement of said rod, said rod located rearward of said restraining means, said guide means comprising a roller mounted on each end of said rod, an inward-facing channel mounted on each longitudinal side of said second table below the level of said second table, said rollers sliding in said channels and guiding said rod for horizontal reciprocation parallel to the top surface of said second table.

2. A bale stacking machine comprising a ground-support frame, a first table extending transversely of said frame, a loader on a first side of said frame having first means for lifting bales from the ground and depositing said bales one at a time on said machine extending transversely of said frame, a second table on said frame rearward of said first table, second means for moving bales longitudinally rearward from said first table onto the forward end of said second table, said second means being operable to move said bales so that the same surfaces of said bales that rest on said first table rest on said second table, restraining means adjacent each forward corner of said second table selectively operable to hold the forward outer corners of a pair of first bales on said second table, as a subsequent second bale deposited on the middle of the forward edge of said second table turns said pair of first bales from a transverse direction toward a longitudinal direction, and longitudinal conveying means on said second table to move a pattern of four bales longitudinally rearwardly on said second table from said forward end to the rearward end of said second table, said second means depositing said bales on said second table rearward of the foremost position of said longitudinal conveying means, said longitudinal conveying means comprising a rod extending transversely of said second table having upstanding bale-engaging tines to push bales on said second table rearwardly, guide means guiding said rod for reciprocation on said second table, actuating means for actuating movement of said rod, said rod located rearward of said restraining means, and a ramp on the forward end of said second table overhanging said rod when said rod is at its forwardmost position.

* * * * *